United States Patent
Kho et al.

(10) Patent No.: US 9,466,377 B2
(45) Date of Patent: Oct. 11, 2016

(54) METHOD AND DEVICE FOR PROCESSING AN ERASE COUNTER

(71) Applicant: Infineon Technologies AG, Neubiberg (DE)

(72) Inventors: Rex Kho, Holzkirchen (DE); Mathew Neal, Pfaffing (DE)

(73) Assignee: Infineon Technologies AG, Neubiberg (DE)

( * ) Notice: Subject to any disclaimer, the term of this patent is extended or adjusted under 35 U.S.C. 154(b) by 95 days.

(21) Appl. No.: 14/190,265

(22) Filed: Feb. 26, 2014

(65) Prior Publication Data
US 2015/0243359 A1 Aug. 27, 2015

(51) Int. Cl.
| | |
|---|---|
| *G11C 16/10* | (2006.01) |
| *G11C 14/00* | (2006.01) |
| *G11C 7/24* | (2006.01) |
| *G06F 21/55* | (2013.01) |
| *G11C 16/34* | (2006.01) |
| *G11C 16/14* | (2006.01) |

(52) U.S. Cl.
CPC ........... *G11C 16/107* (2013.01); *G06F 21/554* (2013.01); *G11C 7/24* (2013.01); *G11C 14/009* (2013.01); *G11C 16/14* (2013.01); *G11C 16/3495* (2013.01)

(58) Field of Classification Search
CPC . G11C 16/14; G11C 16/107; G11C 16/3495; G11C 14/009; G11C 7/24; G06F 21/554
See application file for complete search history.

(56) References Cited

U.S. PATENT DOCUMENTS

| | | | |
|---|---|---|---|
| 5,388,267 A * | 2/1995 | Chan et al. | 713/2 |
| 5,485,595 A | 1/1996 | Assar et al. | |
| 5,612,911 A * | 3/1997 | Timko | 708/670 |
| 5,933,847 A | 8/1999 | Ogawa | |
| 6,000,006 A | 12/1999 | Bruce et al. | |
| 9,021,421 B1 * | 4/2015 | Corry | G06F 12/0253 707/813 |
| 2009/0055715 A1 * | 2/2009 | Jashek et al. | 714/776 |
| 2011/0131368 A1 * | 6/2011 | Lee et al. | 711/103 |
| 2014/0101513 A1 * | 4/2014 | Kim et al. | 714/758 |
| 2014/0269069 A1 * | 9/2014 | D'Abreu et al. | 365/185.11 |

FOREIGN PATENT DOCUMENTS

JP 2006-504199 A 2/2006

OTHER PUBLICATIONS

Office Action dated Feb. 5, 2016 for Japanese Patent Application No. 2015-029004.

* cited by examiner

*Primary Examiner* — Eric Oberly
(74) *Attorney, Agent, or Firm* — Schiff Hardin LLP

(57) ABSTRACT

A embodiment relates to a method for processing an erase counter comprising erase counter fields, the method comprising the steps of (i) determining an unused erase counter field; (ii) writing a selection code and an address information in the unused erase counter field, wherein the selection code and the address information are combined to determine at least one physical address of a memory.

22 Claims, 4 Drawing Sheets

Fig.3

|  | 301 | 302 |
|---|---|---|
| Physical Sector | Sector Address | Logical Sector |
| 0 | 00000000 | 0 |
| 1 | 00000001 | 1 |
| 2 | 00000010 | 2 |
| 3 | 00000011 | 3 |
| 4 | 00000100 | 4 |
| 5 | 00000101 | 5 |
| 6 | 00000110 | 6 |
| 7 | 00000111 | 7 |
| 8 | 00001000 | 8 |
| 9 | 00001001 |  |
| 10 | 00001010 | 9 |
| 11 | 00001011 |  |
| 12 | 00001100 | 10 |
| 13 | 00001101 |  |
| 14 | 00001110 | 11 |
| 15 | 00001111 |  |
| 16 | 00010000 | 12 |
| 17 | 00010001 |  |
| 18 | 00010010 | 13 |
| 19 | 00010011 |  |
| 20 | 00010100 | 14 |
| 21 | 00010101 |  |
| 22 | 00010110 | 15 |
| 23 | 00010111 |  |
| 24 | 00011000 | 16 |
| 25 | 00011001 |  |
| 26 | 00011010 |  |
| 27 | 00011011 |  |
| 28 | 00011100 | 17 |
| 29 | 00011101 |  |
| 30 | 00011110 |  |
| 31 | 00011111 |  |

METHOD AND DEVICE FOR PROCESSING AN ERASE COUNTER

BACKGROUND OF THE INVENTION

Embodiments of the present invention relate to processing of an erase counter that enables monitoring of data manipulation.

SUMMARY

A first embodiment relates to a method for processing an erase counter comprising erase counter fields, the method comprising the steps:
  determining an unused erase counter field;
  writing a selection code and an address information in the unused erase counter field;
  wherein the selection code and the address information are combined to determine at least one physical address of a memory.
A second embodiment relates to a device comprising:
  an erase counter comprising several erase counter fields;
  a processing unit that is arranged for processing the erase counter by
    determining an unused erase counter field;
    writing a selection code and an address information in the unused erase counter field;
    wherein the selection code and the address information are combined to determine at least one physical address of a memory.
A third embodiment relates to a device for processing an erase counter comprising erase counter fields, the device comprising:
  means for determining an unused erase counter field;
  means for writing a selection code and an address information in the unused erase counter field;
  means for wherein the selection code and the address information are combined to determine at least one physical address of a memory.
A forth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 3 shows an exemplary table comprising 32 physical sectors (numbered 0 to 31), each having a physical sector address, wherein a logical address is provided that allows combining several sectors, e.g., for a combined (e.g., parallel) erase operation;

DETAILED DESCRIPTION OF THE PREFERRED EMBODIMENTS

Figure 1:
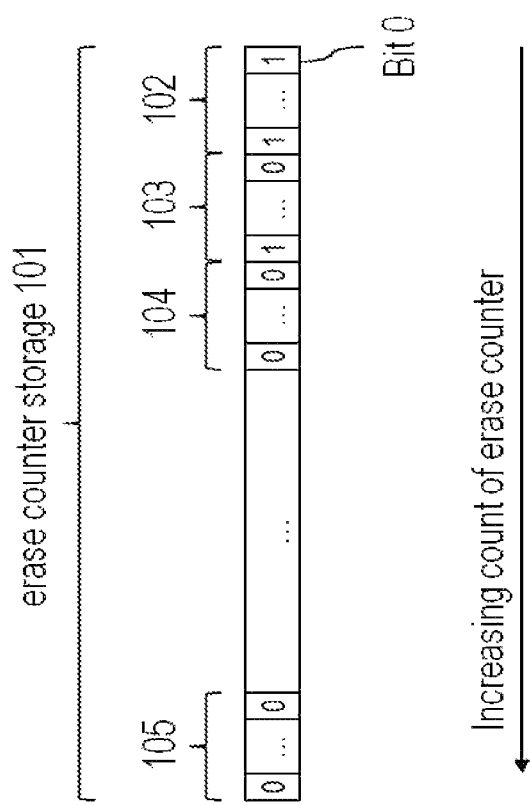
FIG. 1 shows an exemplary diagram of an erase counter storage comprising several erase counter fields.

Non-volatile memories (NVMs) can be programmed and erased by various software applications. The memory may be organized in a way that a group of bits are erased or programmed together. For example, a sector of the memory may be erased or a page of the memory may be programmed. For example, the page may comprise several bits and the sector may comprise several pages.

The examples presented herein allow determining how many erase cycles were conducted on a single sector or a group of sectors. This information may be useful to determine whether the memory has been tampered with, in particular whether the memory was subject to unauthorized changes.

It is noted that the sector mentioned herein is an example of a portion of a memory that can be erased, wherein the sector comprises at least one bit, in particular several bits or several pages. The memory mentioned may in particular be a memory device.

An erase counter concept may be used in any device that has persistent and re-programmable memory, e.g., NAND/NOR Flash, RRAM, MRAM, FeRAM. It may also be applicable for hard drives that have certain sectors set aside as erase counters to monitor if other sections have been erased and/or re-written.

Use cases may relate to scenarios with re-programmable firmware. Exemplary scenarios are: mobile phones, washing machines, engine control modules (e.g., in the automotive field), manufacturing robots in an assembly line, DVD players, game consoles, FPGA devices, etc.

The examples described herein hence in particular provide a non-volatile erase counter to monitor data manipulation.

The memory area is in particular non-volatile. The memory area may be arranged such that it is read-only for application software (i.e. applications running on a device cannot modify this memory area as they wish).

Hence, the erase counter can be used to detect and prove manipulation of a software. For example: A ninth version of an official software release may be associated with eight erase operations which should be indicated by the erase counter. A higher number of erase cycles indicated by the erase counter may be a sign of unauthorized software manipulation.

Hence, the solution presented may be used for security applications or in order to supply evidence of tampering.

For example, the erase counter may be incremented when a sector is about to be erased. The modification of the erase counter may preferably be achieved without any chance of manipulation by the application software. Modification of the erase counter may preferably be encapsulated from an outside programming interface so that it cannot be avoided that any erase operation increments the erase counter.

Advantageously, the erase counter may be implemented in a way that it cannot be deleted by a customer; in particular the erase counter may be arranged such that it can only be deleted prior to the product, in particular the memory device, being shipped to the customer.

Tampering with the content of the memory (device) can be detected by storing the value of the erase counter (such value may be stored inside the memory device and/or external to the memory device) and compare this value with the actual value of the erase counter. The value of the erase counter may be stored after shipping of the memory device and/or after an authorized change (e.g., official update) of the software.

The erase counter may be non-erasable. For example, the erase counter may be stored in a memory area that cannot be erased or that can be configured such that a simple erase of this memory area is not feasible. There may be one erase counter per logical portion, e.g., per at least one logical sector, of the memory. In order to update the erase counter, the erase counter may be read, incremented and written to its memory area. Such update may be conducted per sector.

A write operation may consume significantly more time than a read operation. Erasing several sectors is thus time consuming due to the lengthy write operations involved. Erase procedures may have to be aborted via a special command that allows for an interruption in order to conduct other operations. Such other operations may require the erase operation to have a short abort time, which is difficult to meet due to its lengthy write operations.

According to an example, a selection code may be used to select at least one portion of memory, e.g., a sector or a page. The at least one portion selected by the selection code may be erased. The at least one portion of memory may in particular comprise several portions of memory. The erase may be conducted in parallel for at least some of the several portions of memory.

An erase counter may be provided that is updated via a search loop with a subsequent write operation.

The erase counter may be stored in an erase counter storage, which comprises several erase counter fields. Each of the erase counter fields comprises an address information and the selection code.

The selection code may be written to the erase counter field.

FIG. 1 shows an exemplary diagram of an erase counter storage 101 comprising several erase counter fields 102 to 105. The erase counter storage 101 may be part of a random access memory (e.g., flash RAM or NVM). The erase counter storage 101 is used by allocating the first counter field 102; with a subsequent erase cycle, the next counter field 103, etc. is used. As an advantage, a single counter field 102 to 105 can be associated with an erase operation that is applied to several memory portions, e.g., sectors.

Figure 2:
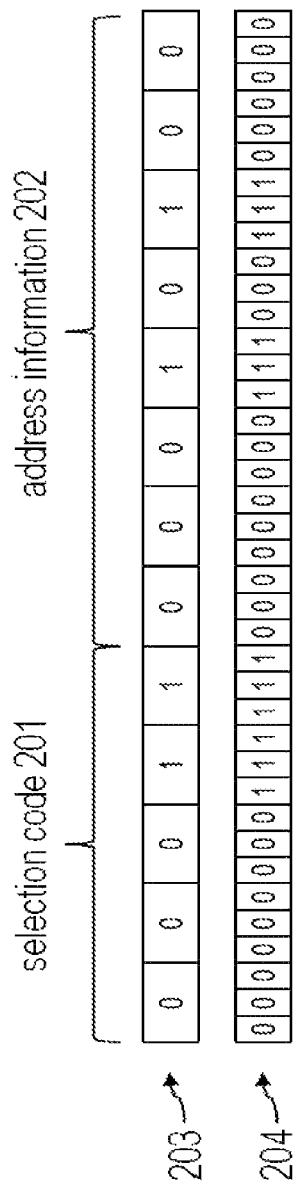
FIG. 2 shows an exemplary structure of an erase counter field and how the erase counter field may be represented in a physical memory structure, e.g., a flash memory.

FIG. 2 shows an exemplary structure of one of the erase counter fields 102 to 105 and how the erase counter fields 102 to 105 may be stored in the memory, e.g., a flash memory.

An erase counter field 203 comprises a selection code 201 and an address information 202. According to the example shown in FIG. 2, the erase counter field 203 has the following value:

the selection code 201 comprising a range of bits 4 to 0 has the value "00011"; and the address information 202 comprising a range of bits 7 to 0 has the value "00010100".

A line 204 of bits shows an example as how to store the erase counter field in a physical flash memory. In this example, each single bit is encoded by three physical bits to add redundancy (i.e. a bit "0" of the erase counter field 203 is coded as "000" and a bit "1" of the erase counter field 203 is coded as "111"): In case one of the bits does not show the correct value (e.g., due to a physical defect), a majority decision based on all three bits can be made to still arrive at the correct bit "0" or "1". This may be useful in case no further error correction code is available and/or this further error correction code is optional and deactivated. It is noted that a number of bits different from three may be used for coding a single bit of the erase counter field 203.

FIG. 3 shows an exemplary table comprising 32 physical sectors (numbered 0 to 31), each having a physical sector address 301. In addition, a logical sector 302 is provided that allows combining several sectors, e.g., for a combined (e.g., parallel) erase operation.

Such combining may be achieved via the selection code and the address information (as also indicated above). In the current example, the sector address is composed of eight bits provided by the address information and the multiple sector addresses are identified via five bits of the selection code.

The selection code may be aligned at the least significant bit (LSB) with the address information and it may be used to determine the sectors to be erased. For example, if the bit of the selection code that corresponds to the position of the address information is "0", the bit of the address information remains unchanged; if the bit of the selection code that corresponds to the position of the address information is "1" then the bit of the address information may be either "0" or "1". Hence, the selection code can be used for selecting either a single physical address or a multitude of physical addresses based on the address information.

Example 1

Erase of Logical Sector 5

The address information and the selection code are determined as follows:
Address information: 00000101
Selection code: 00000
A bitwise OR operation results in the following sector address that is erased:
Sectors erased: 00000101

Example 2

Erase of Logical Sector 16

The address information and the selection code are determined as follows:
Address information: 00011000
Selection code: 00011
A bitwise OR operation results in the following sector addresses that are erased:
Sectors erased: 00011000
00011001
00011010
00011011
Hence, this address information and the selection code can be associated with an erase operation of the physical sectors 24 to 27.

Example 3

Erase of Logical Sectors 14 and 15

The address information and the selection code are determined as follows:
Address information: 00010100
Selection code: 00011
A bitwise OR operation results in the following sector addresses that are erased:
Sectors erased: 00010100
00010101
00010110
00010111

Hence, this address information and the selection code can be associated with an erase operation of the physical sectors 20 to 23.

Example 3 is also the exemplary allocation of the erase counter field 203 in FIG. 2, wherein the sector address 301 corresponds to the address information 202.

It is an advantage of the solution presented that only a single write operation to the erase counter storage is required even in case several portions of memory (e.g., sectors or pages of a memory) are erased. This solution is highly flexible and allows for a multitude of combinations in order to logically address a physical memory structure.

Figure 4:
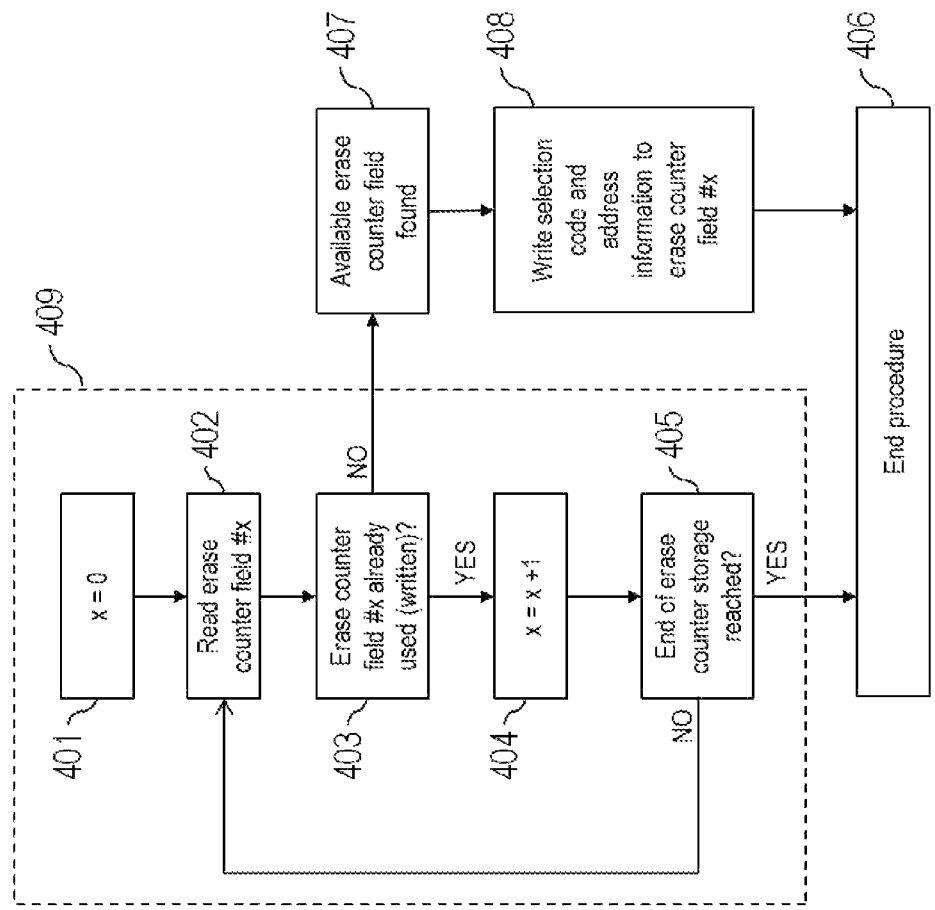
FIG. 4 shows an exemplary flow diagram indicating a routine that may be conducted once per erase operation, even in case several portions (e.g., sectors or page) of a memory are erased.

FIG. 4 shows an exemplary flow diagram indicating a routine that may be conducted once per erase operation, even in case several portions (e.g., sectors or page) of a memory are erased.

In a step 401, a counter x is initialized (e.g., set to 0). In a step 402 the x-th erase counter field (also referred to as "erase counter field number x" or "erase counter field #x") in the erase counter storage is read. In a step 403 it is checked whether this erase counter field number x has already been used, which may be determined in case it shows values other than "0". If this is the case, it is continued with a step 404 incrementing the counter x. In a step 405 it is checked whether the end of the erase counter storage is reached. If this is the case, the procedure ends in a step 405. Optionally, an error or an information may be issued indicating an overflow of the erase counter storage. If the end of the erase counter storage is not reached, it is branched to the step 402 and the erase counter field number x is read.

If step 403 reveals that the erase counter field number x has not already been used, it is continued with a step 407 which indicates that an available erase counter field was found in the erase counter storage. In a subsequent step 408 the erase counter field found is written with the selection code and the address information. Next, the procedure ends in the step 406.

Optionally, the actual erase operation based on the selection code and the address information can be conducted subsequent or in advance to step 408.

The steps 401 to 405 can be regarded as a search routine 409. The search routine 409 can be accelerated, e.g., via a binary search algorithm.

The solution shown in FIG. 4 bears the advantage that the update of the erase counter storage is divided into a fast search routine 409 (including read operations directed to the erase counter fields) and a single write operation 408 to the erase counter storage. This enables a fast update routine for the erase counter storage.

Also, the examples presented allow for a high degree of flexibility, because single or multiple portions of the memory (e.g., sectors or page) can be addressed via one selection code. Hence, this selection code can be used to erase several of these portions. Preferably, the selection code and the address information are stored in the erase counter storage after the erase operation has been triggered, in particular after the erase operation has been conducted.

The examples suggested herein may in particular be based on at least one of the following solutions. In particular combinations of the following features could be utilized in order to reach a desired result. The features of the method could be combined with any feature(s) of the device, apparatus or system or vice versa.

A method is suggested for processing an erase counter comprising erase counter fields, the method comprising the steps:
  determining an unused erase counter field;
  writing a selection code and an address information in the unused erase counter field;
    wherein the selection code and the address information are combined to determine at least one physical address of a memory.

The unused erase counter field may be determined via a search operation.

Advantageously, a single selection code can be used to determine one or several physical addresses of the memory. Hence, an erase operation may be directed to several portions, e.g., sectors, of a memory which can be reflected by a single update of the erase counter.

An exemplary implementation of the erase counter uses a thermometer code (or unary code). For example, each erase counter field may be used to indicate an single piece or increment of the erase counter and in this regard correspond to a single bit of the thermometer code.

Unary coding, also referred to as thermometer code, is an entropy encoding that represents a natural number, k, with k ones followed by a zero (if natural number is understood as non-negative integer) or with k−1 ones followed by a zero (if natural number is understood as strictly positive integer). For example, the number 5 is represented as 111110 or 11110. Some representations use k or k−1 zeroes followed by a one. The ones and zeroes are interchangeable without loss of generality. Unary coding is both a Prefix-free code and a self-synchronizing code (see, e.g., http://en.wikipedia.org/wiki/Thermometer_code).

It is noted that the erase counter may be stored in an erase counter area of a memory.

It is also noted that the counter fields may be arranged in an ascending order such that the counter fields may be set one after another to represent an increasing count of the erase counter. The counter fields may thus be used to successively fill the erase counter, wherein setting a single counter field may be an increment of such erase counter. Preferably, the erase counter can only be set, not re-set. This allows determining the number of erase cycles or erase operations applied to a portion of a memory, e.g., a sector or a page of the memory.

It is further noted that incrementing the erase counter may comprise an increase by one or an increase by a value larger than one.

Advantageously, the solution allows determining how many erase cycles were conducted on said portion of the memory, i.e. on a single sector or a group of sectors of the memory. This information can be used to determine whether the memory has been tampered with, in particular whether the memory was subject to unauthorized changes.

It is further noted that erase cycles on a hard drive or a portion of the hard drive (e.g., sector) can be counted via the erase counter as described herein.

In an embodiment, the physical address of the memory is directed to a sector or to a page of the memory.

In an embodiment, at least one sector or at least one page of the memory is subject to an erase operation.

In an embodiment, the erase operation is triggered or conducted prior to said processing of the erase counter or after said processing of the erase counter.

In an embodiment, the selection code and the address information are combined to determine several physical addresses of the memory.

In an embodiment, the selection code determines one or several physical addresses within the address information.

The selection code may in particular provide a mask that can be combined with the address information to determine—within a scope provided by the address information—several physical addresses of the memory via a single selection code.

In an embodiment, the method further comprises the steps:
  aligning the selection code at the least significant bit with the address information
  determining at least one physical address that is subject to an erase operation by combining the selecting code and the address information, wherein
    a first of the selection code indicates that a corresponding bit of the address information remains unchanged or
    a second value of the selection code indicates that a corresponding bit of the address information may be either "0" or "1".

In an embodiment, the first value is "0" and the second value is "1".

In an embodiment, determining an unused erase counter field comprises conducting a search operation for the unused erased counter field in an erase counter storage provided for the erase counter.

In an embodiment, the erase counter is incremented by writing the selection code and the address information to the unused erase counter field.

The erase counter may have a predetermined number of erase counter field, which may initially be all empty. The erase counter can be set by writing data to the first free erase counter field. The erase counter is incremented by writing data to the next free erase counter field. The erase counter fields may be used subsequently to increase the count of the erase counter. As an alternative, the erase counter fields may be used according to a predetermined scheme to fill the erase counter. Advantageously, the erase counter cannot be reset by an application software.

In an embodiment, the erase counter is associated with a portion of a memory, in particular a non-volatile memory, and wherein an erase operation applied to said portion of the memory triggers incrementing the erase counter.

In an embodiment, the erase counter is part of a non-volatile memory, wherein the memory of the erase counter is not accessible or read-only to an application software.

In an embodiment, the erase counter is a non-volatile erase counter.

In an embodiment, each logical bit of the erase counter field comprises several physical bits, wherein a majority decision is made based on the several physical bits for the corresponding logical bit.

The majority decision is an example of how to utilize the redundancy of the several physical bits that are used to represent a single logical bit. However, other operations may be applied accordingly. It is also possible to use a code with redundancy or an error detection code and/or an error correction code to determine if the logical bits.

In particular, at least some (or all) bits of the selection code and/or the address information may be mapped to at least two physical bits each for redundancy purposes.

In an embodiment, the method further comprises the steps:
  reading the erase counter and storing it in a register;
  searching for the unused erase counter field;
  writing the selection code and the address information in the unused erase counter field; and
  writing the register back to the erase counter.

In an embodiment, the method comprises the step:
  indicating a warning or an error in case writing the register back to the erase counter was not successful.

In an embodiment, the method comprises the step:
  issuing an overflow indication in case no unused erase counter filed was found.

In an embodiment, the overflow indication is used to extend the erase counter.

Also, a device is provided, the device comprising:
  an erase counter comprising several erase counter fields;
  a processing unit that is arranged for processing the erase counter by
    determining an unused erase counter field;
    writing a selection code and an address information in the unused erase counter field;
    wherein the selection code and the address information are combined to determine at least one physical address of a memory.

Said processing unit may be any processing device that may be provided together with the memory on the same chip or die or external to the memory. The processing unit may comprise portions of hardware, software and/or firmware. The processing unit may be arranged in a distributed way among several components or it may be a single piece of hardware.

It is noted that the features described with regard to the method may be applicable for the device(s) mentioned herein as well. This applies in particular for the processing unit, which may conduct the steps described in view of the method.

In an embodiment, the device further comprises a memory portion, wherein the processing unit is arranged for processing the erase counter based on an erase procedure to be conducted on the memory portion.

The memory portion may be a sector or a page of a (non-volatile) memory. The memory portion may be erased in a single erase step. The erase counter may be a physical part of the memory that also contains the memory portion. As an alternative, the erase counter may be located on a separate memory device. The erase counter may be a counter coded according to an unary code, e.g., a thermometer code.

In an embodiment, the processing unit is arranged for
  reading the erase counter and storing it in a register;
  searching for the unused erase counter field;
  writing the selection code and the address information in the unused erase counter field; and
  writing the register back to the erase counter.

In an embodiment, the device is implemented on a single chip or die.

The device may in particular be a (single) chip or an arrangement comprising several chips. A chip may comprise an integrated circuit, a die and/or a semiconductor device.

In an embodiment, the memory portion is part of a non-volatile memory.

In an embodiment, the memory portion comprises at least one of the following
  floating gate cells;
  PCRAM,
  RRAM,
  MRAM,
  MONOS devices,
  nano crystal cells,
  FeRAM,
  hard drive,
  non-volatile storage.

In an embodiment, the erase counter is arranged such that it is not accessible to an application software or that it is read-only to the application software.

A device is suggested for processing an erase counter comprising erase counter fields, the device comprising:
  means for determining an unused erase counter field;
  means for writing a selection code and an address information in the unused erase counter field;

means for wherein the selection code and the address information are combined to determine at least one physical address of a memory.

A computer program product is suggested, directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor", as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing an erase counter comprising erase counter fields, the method comprising:
   determining an unused erase counter field;
   writing a selection code and an address information in the unused erase counter field, the selection code being indicative that one or more corresponding bits of the address information are:
      defined by multiple bit values in a first operation, wherein, in the first operation, a value of the selection code indicates that a corresponding bit of the address information may be either "0" or "1"; and
      defined by single bit values in a second operation, wherein, in the second operation, a value of the selection code indicates that a corresponding bit of the address information remains unchanged;
   aligning the selection code at a least significant bit with the address information; and
   combining the selection code and the address information to determine at least one physical address of a memory that is subject to an erase operation.

2. The method according to claim 1, wherein the physical address of the memory is directed to a sector or to a page of the memory.

3. The method according to claim 2, wherein at least one sector or at least one page of the memory is subject to the erase operation.

4. The method according to claim 3, wherein the erase operation is triggered or conducted prior to said processing of the erase counter or after said processing of the erase counter.

5. The method according to claim 1, wherein the selection code and the address information are combined to determine several physical addresses of the memory.

6. The method according to claim 1, wherein the selection code determines one or several physical addresses within the address information.

7. The method according to claim 1, wherein the first value is "0" and the second value is "1".

8. The method according to claim 1, wherein determining an unused erase counter field comprises conducting a search operation for the unused erased counter field in an erase counter storage provided for the erase counter.

9. The method according to claim 1, wherein the erase counter is incremented by writing the selection code and the address information to the unused erase counter field.

10. The method according to claim 1, wherein the erase counter is associated with a portion of the memory, in particular a non-volatile memory, and wherein the erase operation applied to said portion of the memory triggers incrementing the erase counter.

11. The method according to claim 1, wherein the erase counter is part of a non-volatile memory, wherein the memory of the erase counter is not accessible or read-only to an application software.

12. The method according to claim 1, wherein each bit of the erase counter field is defined by a plurality of bits, wherein a majority decision is made based on the plurality of bits for the corresponding bit.

13. The method according to claim 1, the method further comprising:
reading the erase counter and storing it in a register;
searching for the unused erase counter field;
writing the selection code and the address information in the unused erase counter field; and
writing the register back to the erase counter.

14. The method according to claim 13, comprising:
indicating a warning or an error in case writing the register back to the erase counter was not successful.

15. A device comprising:
an erase counter comprising several erase counter fields; and
a processor configured to:
determine an unused erase counter field;
write a selection code and an address information in the unused erase counter field, the selection code being indicative that one or more corresponding bits of the address information are:
defined by multiple bit values in a first operation, wherein, in the first operation, a value of the selection code indicates that a corresponding bit of the address information may be either "0" or "1"; and
defined by single bit values in a second operation, wherein, in the second operation, a value of the selection code indicates that a corresponding bit of the address information remains unchanged;
align the selection code at a least significant bit with the address information; and
combine the selection code and the address information to determine at least one physical address of a memory that is subject to an erase operation.

16. The device according to claim 15, wherein the memory comprises a memory portion, and wherein the processor is configured to process the erase counter based on the erase operation to be conducted on the memory portion.

17. The device according to claim 15, wherein the processor is further configured to:
read the erase counter and storing it in a register;
search for the unused erase counter field;
write the selection code and the address information in the unused erase counter field; and
write the register back to the erase counter.

18. The device according to claim 15, wherein the device is implemented on a single chip or die.

19. The device according to claim 15, wherein the memory portion is part of a non-volatile memory.

20. The device according to claim 15, wherein the memory portion comprises at least one of the following:
floating gate cells;
PCRAM,
RRAM,
MRAM,
MONOS devices,
nano crystal cells,
FeRAM,
hard drive, and
non-volatile storage.

21. A device for processing an erase counter comprising erase counter fields, the device comprising:
means for determining an unused erase counter field;
means for writing a selection code and an address information in the unused erase counter field, the selection code being indicative that one or more corresponding bits of the address information are:
defined by multiple bit values in a first operation, wherein, in the first operation, a value of the selection code indicates that a corresponding bit of the address information may be either "0" or "1"; and
defined by single bit values in a second operation, wherein, in the second operation, a value of the selection code indicates that a corresponding bit of the address information remains unchanged;
means for aligning the selection code at a least significant bit with the address information; and
means for combining the selection code and the address information to determine at least one physical address of a memory.

22. A computer program product embodied on a non-transitory computer-readable medium comprising software code stored thereon, when executed, cause a processor to perform the method according to claim 1.

* * * * *